US012689487B2

(12) United States Patent
Mei et al.

(10) Patent No.: US 12,689,487 B2
(45) Date of Patent: Jul. 21, 2026

(54) DEMODULATION REFERENCE SIGNAL INDICATION FOR CO-SCHEDULED USER EQUIPMENT

(71) Applicant: ZTE Corporation, Shenzhen (CN)

(72) Inventors: Meng Mei, Shenzhen (CN); Bo Gao, Shenzhen (CN); Shujuan Zhang, Shenzhen (CN); Ke Yao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 365 days.

(21) Appl. No.: 18/521,343

(22) Filed: Nov. 28, 2023

(65) Prior Publication Data

US 2024/0097857 A1     Mar. 21, 2024

Related U.S. Application Data

(63) Continuation of application No. PCT/CN2022/110692, filed on Aug. 5, 2022.

(51) Int. Cl.
H04L 5/00          (2006.01)
H04W 72/23       (2023.01)

(52) U.S. Cl.
CPC .......... H04L 5/0053 (2013.01); H04W 72/23 (2023.01)

(58) Field of Classification Search
CPC ... H04L 5/0053; H04L 5/0016; H04L 5/0094; H04L 5/0051; H04W 72/23
See application file for complete search history.

(56) References Cited

U.S. PATENT DOCUMENTS

2019/0296876 A1* 9/2019 Zhang ................... H04L 5/0048
2021/0105785 A1    4/2021 Manolakos et al.
(Continued)

FOREIGN PATENT DOCUMENTS

| CN | 108111291 | 6/2018 |
| CN | 112956234 | 6/2021 |
| CN | 113796146 A | 12/2021 |

(Continued)

OTHER PUBLICATIONS

International Search Report and Written Opinion for PCT/CN2022/110692, filed Aug. 5, 2022, Report dated Dec. 13, 2022, 9 pages.
(Continued)

*Primary Examiner* — Charles C Jiang
*Assistant Examiner* — Rachel Elizabeth Cerlanek
(74) *Attorney, Agent, or Firm* — Perkins Coie LLP

(57) ABSTRACT

Methods, apparatus, and systems that relate to channel demodulation and interference estimation with respect to Demodulation Reference Signal (DMRS) for co-scheduled terminal devices are disclosed. In one example aspect, a method for wireless communication includes receiving, by a first terminal device, a signaling message from a base station scheduling a first transmission from the base station to the first terminal device. The method includes determining, by the first terminal device based on the signaling message, that at least one of the plurality of antenna ports is associated with a second transmission to a second terminal device and demodulating, by the first terminal device, the first transmission from the base station based on the signaling message and the determining.

20 Claims, 8 Drawing Sheets

Existing DMRS type 2, one front loaded DMRS symbol, 4 DMRS RE per port per symbol CDM group#2 in which port 4 and 5 are mapped CDM group#1 in which port 2 and 3 are mapped CDM group#0 in which port 0 and 1 are mapped Symbol #n

(56)     References Cited

U.S. PATENT DOCUMENTS

| | | | | |
|---|---|---|---|---|
| 2021/0320772 A1* | 10/2021 | Zewail | .................. | H04L 5/0051 |
| 2023/0224127 A1* | 7/2023 | Xie | ........................ | H04L 5/0026 |

FOREIGN PATENT DOCUMENTS

| | | | | | |
|---|---|---|---|---|---|
| EP | 3639462 | A | | 4/2020 | |
| EP | 3639462 | B1 * | 10/2023 | | .............. H04J 13/00 |
| WO | 2020/002662 | | | 1/2020 | |
| WO | 2021/206802 | A2 | | 10/2021 | |
| WO | 2021/206802 | A3 | | 10/2021 | |
| WO | 2023/141942 | | | 8/2023 | |

OTHER PUBLICATIONS

Oppo "Text proposals for enhancements on Multi-TRP and panel Transmission" 3GPP TSG RAN WG1 #100 R1-2000457, e-Meeting, Feb. 24-Mar. 6, 2020, 17 pages.

MediaTek, Inc. "Enhancements on multi-TRP/panel transmission" 3GPP TSG RAN WG1 #98 R1-1908379, Prague, CZ, Aug. 26-30, 2019, 8 pages.
CMCC "Discussion on increased number of orthogonal DMRS ports" 3GPP TSG RAN WG1 #109-e, R1-2204290, e-Meeting, May 9-20, 2022, 3 pages.
Intel Corp. "DM-RS Enhancements for Rel-18 NR" 3GPP TSG RAN WG1 #109-e R1-2204788, e-Meeting, May 9-20, 2022, 8 pages.
ZTE "DMRS enhancement for UL/DL MU-MIMO and 8 Tx UL SU-MIMO" 3GPP TSG RAN WG1 #109-e R1-2203266, e-Meeting, May 9-20, 2022, 6 pages.
Vivo "Views on DMRS enhancements" 3GPP TSG RAN WG1 #109-e R1-2203544, e-Meeting, May 9-20, 2022, 7 pages.
NTT DOCOMO "FL summary on DMRS" 3GPP TSG RAN WG1 Meeting #109-e R1-2205208, e-Meeting, May 9-20, 2022, 38 pages.
Extended European Search Report for EP Appl. No. 22942948.5, Report dated Jan. 13, 2025, 12 pages.
CNIPA, First Office Action for Chinese Application No. 202280047392X, mailed on Oct. 18, 2025, 18 pages with unofficial English translation.

* cited by examiner

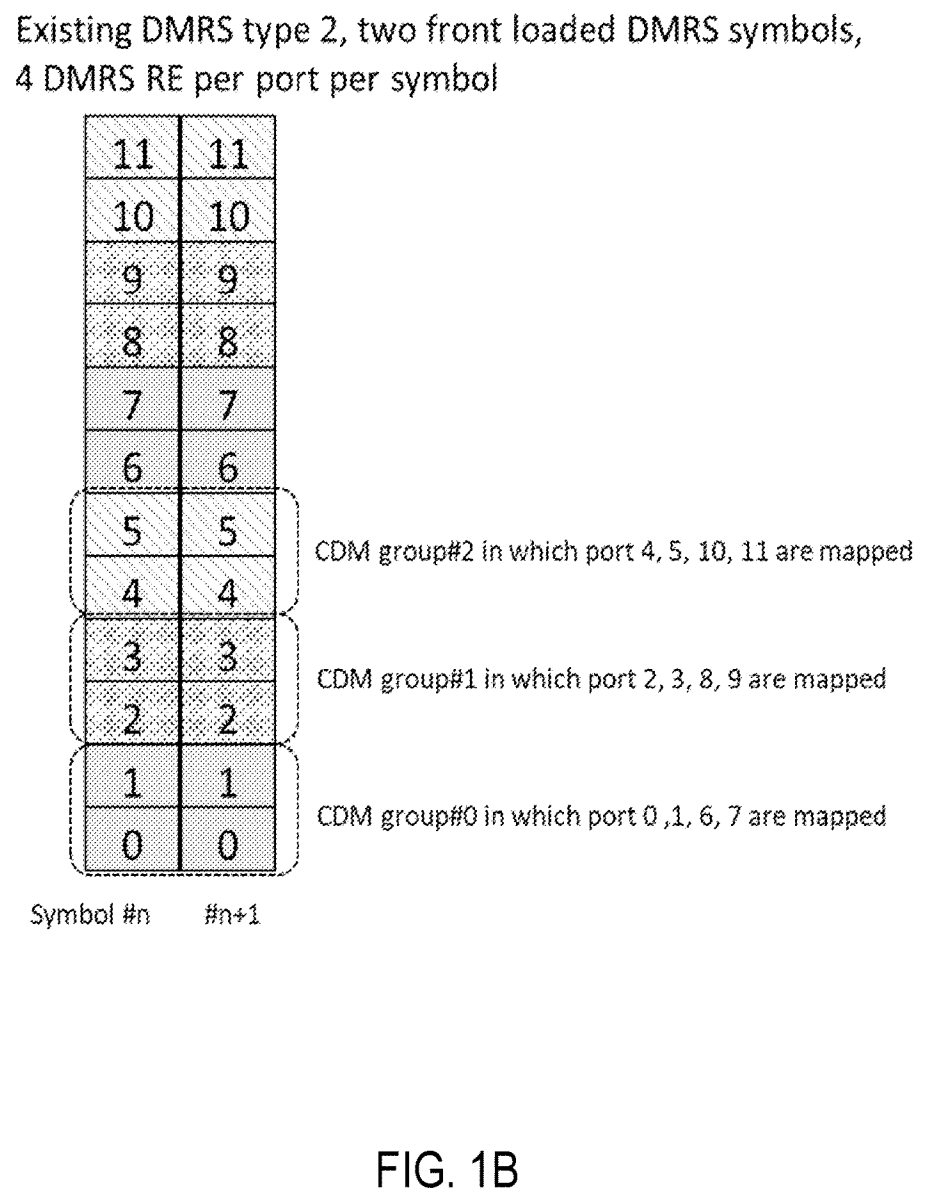

Existing DMRS type 2, two front loaded DMRS symbols,
4 DMRS RE per port per symbol

| Symbol #n | #n+1 | |
|---|---|---|
| 11 | 11 | |
| 10 | 10 | |
| 9 | 9 | |
| 8 | 8 | |
| 7 | 7 | |
| 6 | 6 | |
| 5 | 5 | CDM group#2 in which port 4, 5, 10, 11 are mapped |
| 4 | 4 | |
| 3 | 3 | CDM group#1 in which port 2, 3, 8, 9 are mapped |
| 2 | 2 | |
| 1 | 1 | CDM group#0 in which port 0, 1, 6, 7 are mapped |
| 0 | 0 | |

FIG. 1B

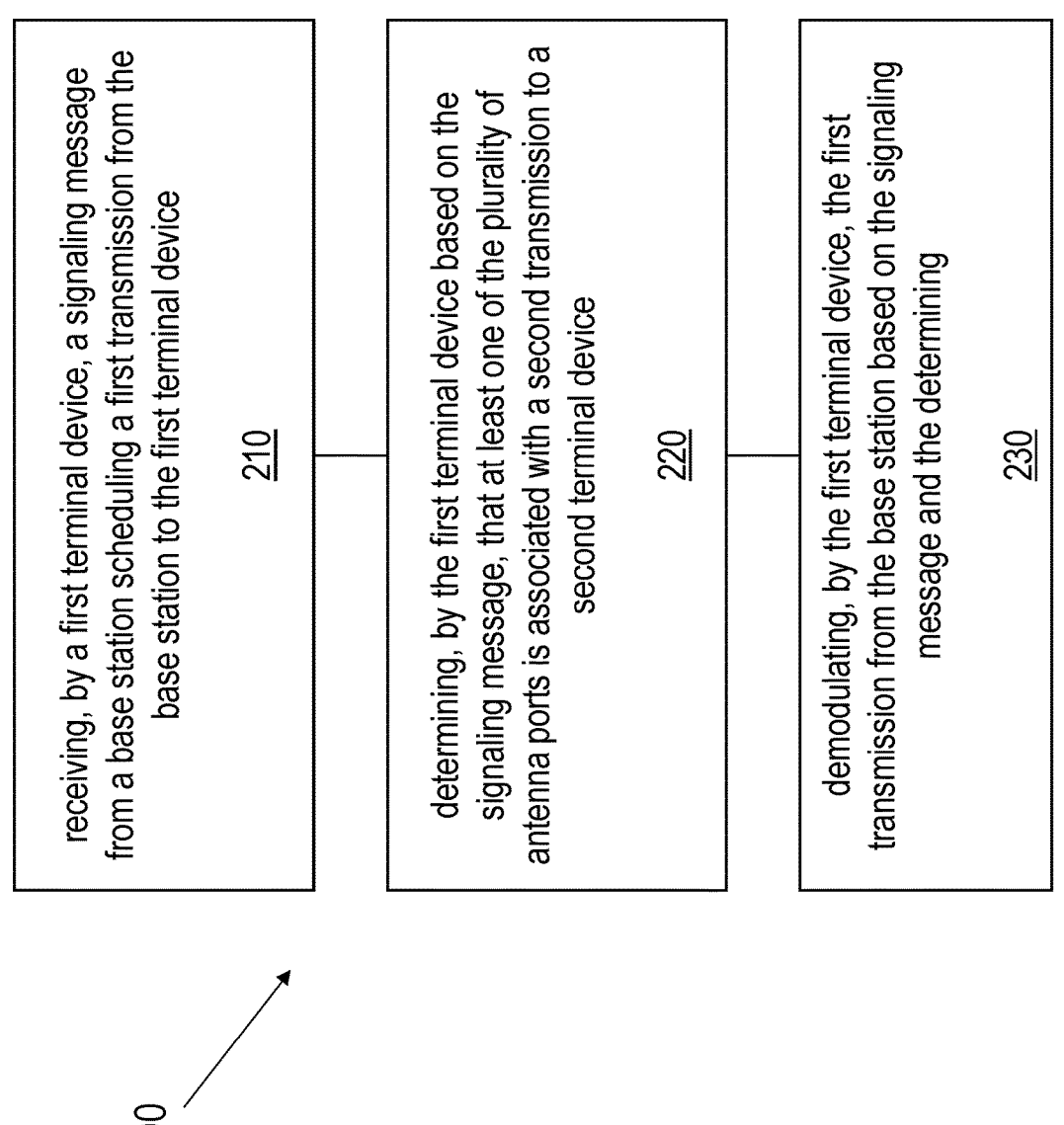

200 receiving, by a first terminal device, a signaling message from a base station scheduling a first transmission from the base station to the first terminal device

210 determining, by the first terminal device based on the signaling message, that at least one of the plurality of antenna ports is associated with a second transmission to a second terminal device

220 demodulating, by the first terminal device, the first transmission from the base station based on the signaling message and the determining

250 transmitting, by a base station, a signaling message to a first terminal device scheduling a first transmission from the base station to the first terminal device

260

DEMODULATION REFERENCE SIGNAL INDICATION FOR CO-SCHEDULED USER EQUIPMENT

CROSS-REFERENCE TO RELATED APPLICATION

This application is a continuation and claims priority to International Application No. PCT/2022/110692, filed on Aug. 5, 2022, the disclosure of which is hereby incorporated by reference herein in its entirety.

TECHNICAL FIELD

This patent document is directed to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that related to the indication of Demodulation Reference Signal (DMRS) for interference estimation when a User Equipment (UE) is co-scheduled with other UEs.

In one example aspect, a method for wireless communication includes receiving, by a first terminal device, a signaling message from a base station scheduling a first transmission from the base station to the first terminal device. The signaling message indicates information of a plurality of antenna ports associated with Demodulation Reference Signal (DMRS) and a number of Code Division Multiplexing (CDM) groups without data indicated for the first transmission. The method includes determining, by the first terminal device based on the signaling message, that at least one of the plurality of antenna ports is associated with a second transmission to a second terminal device and demodulating, by the first terminal device, the first transmission from the base station based on the signaling message and the determining.

In another example aspect, a method for wireless communication includes transmitting, by a base station, a signaling message to a first terminal device. The signaling message indicates a plurality of antenna ports associated with a Demodulation Reference Signal (DMRS) and a number of Code Division Multiplexing (CDM) groups without data configured for a first transmission from the base station to the first terminal device to enable the first terminal device to demodulate the first transmission based on the signaling message and a determination of whether at least one of the plurality of antenna ports is associated with a second transmission to a second terminal device.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 1B illustrates an example type2 DMRS with two front-loaded DMRS symbols.

FIG. 2A illustrates a method for wireless communication in accordance with one or more embodiments of the present technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1A:
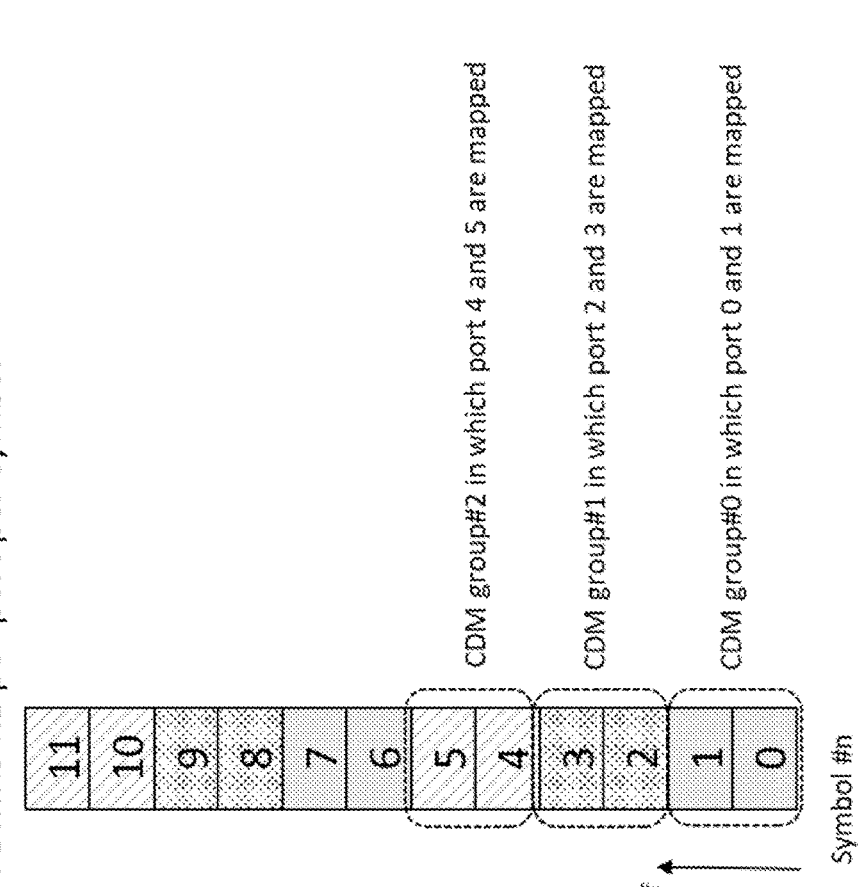
FIG. 1A illustrates an example type2 Demodulation Reference Signal (DMRS) with one front-loaded DMRS symbol.

In wireless communication systems, Demodulation Reference Signal (DMRS) is used by the receiver to perform channel estimation and demodulation of the associated channel. Currently, two types of DMRS are supported: DMRS type 1 and DMRS type 2. For type 1 DMRS, the minimum resource element group in frequency domain is one resource element (RE). For type 2 DMRS, the minimum resource element group in frequency domain is two consecutive REs. FIG. 1A illustrates an example type2 DMRS with one front-loaded DMRS symbol. One DMRS symbol (also referred to as the one front-loaded DMRS symbol) is configured by Radio Resource Control (RRC) signaling or indicated by Downlink Control Information (DCI) signaling. Two adjacent REs in the frequency domain form one DMRS Code Division Multiplexing (CDM) group, e.g., by applying Frequency-Domain (FD) Orthogonal Cover Coding (OCC) having a length of two. In this specific example, DMRS port 0 and 1 are multiplexed in CDM group #0. The CDM group #0 is repeated twice, one being in RE #0 and #1 and the other one being in RE #6 and #7 (e.g., port 0 and port1 are multiplexed in RE #0 and RE #1 in the CDM manner, and port 0 and port 1 are also multiplexed in RE #6 and RE #7 in the CDM manner). Six DMRS ports can be supported in the case of one DMRS symbol, and the density of each DMRS port is 4 REs per PRB per symbol.

FIG. 1B illustrates an example type2 DMRS with two front-loaded DMRS symbols. Two DMRS symbols (also referred to as the two front-loaded DMRS symbols) are configured by the RRC signaling or indicated by the DCI signaling. Four adjacent REs form one DMRS CDM group, e.g., by applying FD-OCC having a length of two and Time-Domain (TD) OCC having a length of two on consecutive symbols. In this specific example, DMRS port 0, 1, 6 and 7 are multiplexed in CDM group #0 in the CDM manner, and the CDM group #0 is repeated twice. Twelve DMRS ports are supported in the case of two DMRS symbols, and the density of each DMRS port is 8 REs per PRB per two symbols.

Figure 1C:
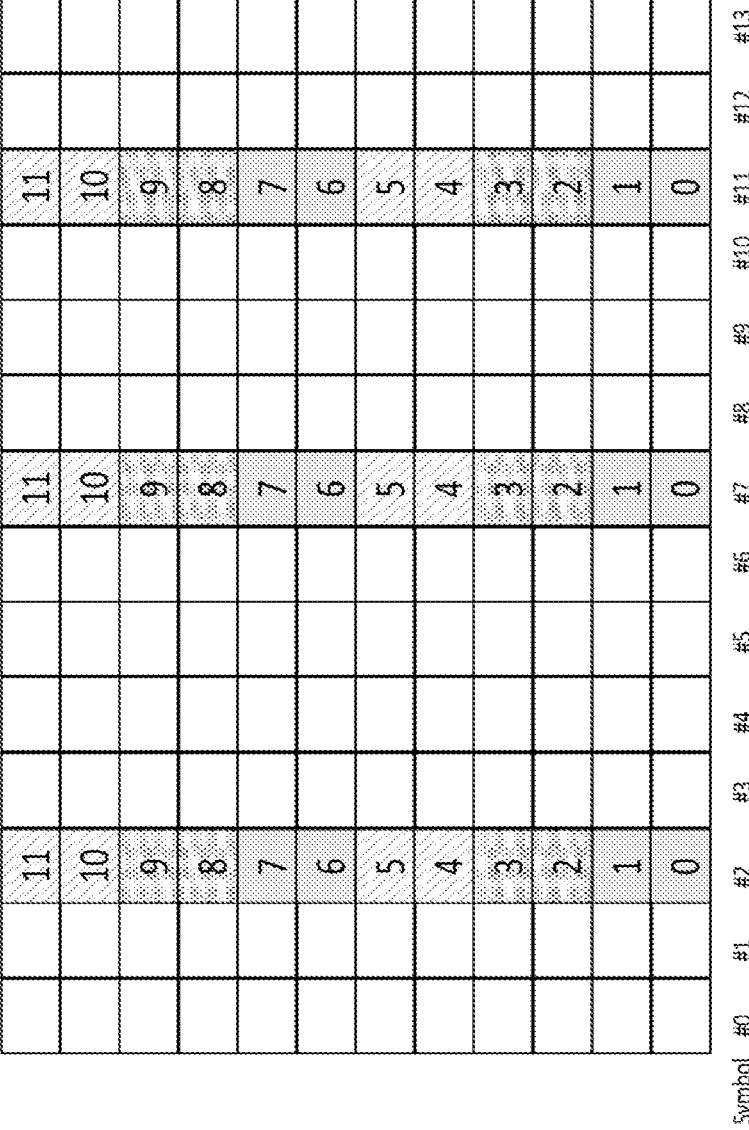
FIG. 1C illustrates another example DMRS with three DMRS symbols.

FIG. 1C illustrates another example DMRS with three DMRS symbols. In some embodiments, one front loaded DMRS symbol can be configured in a slot, and one or more additional DMRS symbols (e.g., one or two DMRS symbols) can be configured.

With the advance of wireless communication, there exists a need to support more DMRS ports, along with other techniques, to improve channel demodulation performance and provide reliable, robust communications. Alternative mapping mechanisms, such as FD-OCC having a length greater than two (e.g., four or six), TD-OCC on non-consecutive symbols, and/or having PRB resources to be associated with more than three CDM groups, can be used to provide more DMRS ports. However, when the base station uses a signaling message (e.g., Downlink Control Information, DCI, message) to schedule multiple User Equipment (UE) devices, each UE needs to estimate channel interference across the different UEs based on the DMRS ports. In doing so, each UE needs to understand whether the DMRS ports are mapped using the legacy approach (e.g., FD-OCC having a length of two and/or TD-OCC on two consecutive symbols) or the alternative/new approach(es) that can allow mapping of more DMRS ports.

To schedule a transmission on the Physical Shared Channel (PDSCH) of a cell, the base station transmits DCI signaling messages (e.g., format 1_0, 1_1, or 1_2) to the UEs. Besides the parameters that schedule the data portion of the transmission, the DCI signaling message also carries various parameters, such as an antenna port(s) field, to indicate parameters associated with the non-data portion of the transmission (e.g., DMRS transmission). Table 1 shows one example mapping table for the antenna port(s) indicated by a DCI message.

TABLE 1

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 3 | 0, 1 | 1 |
| 4 | 3 | 2, 3 | 1 |
| 5 | 3 | 4, 5 | 1 |
| 6 | 2 | 0, 2 | 1 |
| 7 | 3 | 0, 1 | 2 |
| 8 | 3 | 2, 3 | 2 |
| 9 | 3 | 4, 5 | 2 |
| 10 | 3 | 6, 7 | 2 |
| 11 | 3 | 8, 9 | 2 |
| 12 | 3 | 10, 11 | 2 |
| 13 | 1 | 0, 1 | 2 |
| 14 | 1 | 6, 7 | 2 |
| 15 | 2 | 0, 1 | 2 |

4

TABLE 1-continued

| Value | Number of DMRS CDM group(s) without data | DMRS port(s) | Number of front-load symbols |
|---|---|---|---|
| 16 | 2 | 2, 3 | 2 |
| 17 | 2 | 6, 7 | 2 |
| 18 | 2 | 8, 9 | 2 |
| 19-31 | Reserved | Reserved | Reserved |

When the base station schedules multiple UEs using the DCI, the information regarding the number of CDM groups without data can help the UE understand whether other UEs are co-scheduled as well. In some cases, such as type 1 or type 2 DMRS scheduled with two codewords, the UE may assume that all the remaining antenna ports are not associated with transmission(s) of another UE. In other cases, the UE can estimate the interference based on the other DMRS ports (e.g., in the same CDM group or different CDM groups) according to the indicated DMRS ports and the number of CDM group number without data. For example, the existing DMRS port mapping supports up to four DMRS ports in one CDM group for double symbol DMRS. The DMRS ports are 6 and 7 when the number of DMRS CDM group(s) without data is 1 and the number of front-load symbols is 2, as shown in Table 1 for value 14. This indicates that interference estimation can be performed based on the other DMRS ports (e.g., DMRS ports #0, 1) in the same CDM groups.

However, the mapping information such as shown in Table 1 is not sufficient to inform UE of whether the legacy mapping of the DMRS ports (also referred to as legacy DMRS ports) or the new/alternative mapping of DMRS ports (also referred to as new DMRS ports) is used for the UE to estimate interference. This patent document discloses techniques that can enable the UE to correctly demodulate the channel and estimate channel interference using additional information from the base station. The additional information can indicate whether the DMRS ports are configured for co-scheduled UEs and/or whether the legacy mapping of the DMRS ports, the new mapping of the DMRS ports, or a combination thereof is configured for the co-scheduled UEs. In some embodiments, the indication of co-scheduled DMRS ports can be used to determine at least one of the following: (1) whether there are DMRS ports configured for the co-scheduled UES for interference estimation (also referred to as interference DMRS ports), (2) the number of interference DMRS ports in total, if configured, and/or (3) whether at least part of the interference DMRS ports are legacy DMRS ports or new DMRS ports. For example, in some embodiments, a total number of DMRS ports for all co-scheduled UE(s) or a total number of DMRS ports in each CDM group is indicated to a target UE, and the target UE can derive whether there are interference DMRS ports, the number of interference DMRS ports, and/or whether or which of these interference DMRS ports are legacy DMRS ports or new DMRS ports based on the indication.

It is noted that the following discussions focus on the fields of the DCI signaling messages. However, similar techniques can also be applied to the Medium Access Control (MAC) Control Element (CE) signaling.

FIG. 2A illustrates a method for wireless communication in accordance with one or more embodiments of the present technology. The method 200 includes, at operation 210, receiving, by a first terminal device, a signaling message from a base station scheduling a first transmission from the base station to the first terminal device. The signaling message indicates information of a plurality of antenna ports associated with Demodulation Reference Signal (DMRS) and a number of Code Division Multiplexing (CDM) groups without data indicated for the first transmission. The method 200 includes, at operation 220, determining, by the first terminal device based on the signaling message, that at least one of the plurality of antenna ports is associated with a second transmission to a second terminal device. The method 200 includes, at operation 230, demodulating, by the first terminal device, the first transmission from the base station based on the signaling message and the determining.

Figure 2B:
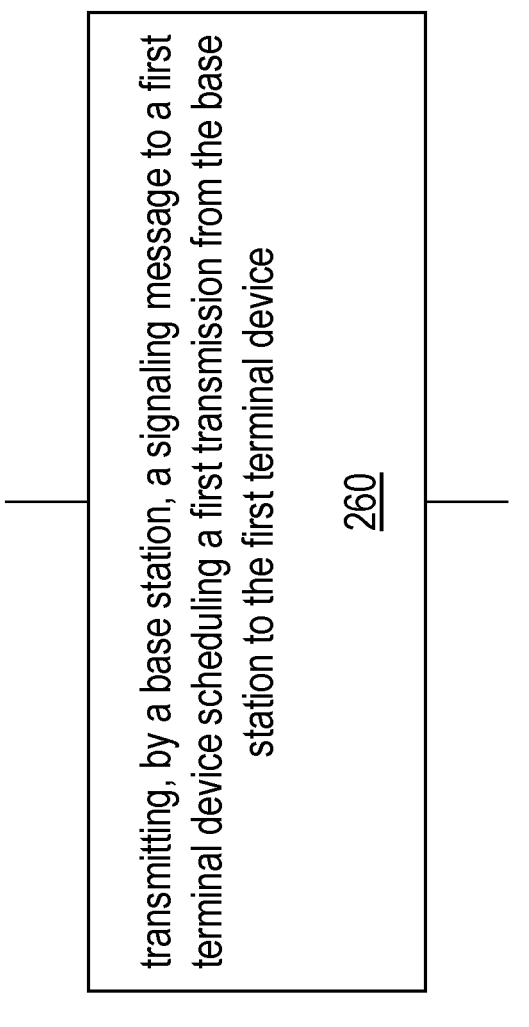
FIG. 2B illustrates another method for wireless communication in accordance with one or more embodiments of the present technology.

FIG. 2B illustrates a method for wireless communication in accordance with one or more embodiments of the present technology. The method 250 includes, at operation 260, transmitting, by a base station, a signaling message to a first terminal device scheduling a first transmission from the base station to the first terminal device. The signaling message indicates a plurality of antenna ports associated with a Demodulation Reference Signal (DMRS) and a number of Code Division Multiplexing (CDM) groups without data indicated for the first transmission to enable the first terminal device to demodulate the first transmission based on the signaling message and a determination of whether at least one of the plurality of antenna ports is associated with a second transmission to a second terminal device.

In some embodiments, at least one of the plurality of antenna ports associated with the second transmission to the second terminal device is associated with a CDM group indicated by the number of CDM groups without data.

In some embodiments, the signaling message comprises a Downlink Control Information (DCI) signaling message.

In some embodiments, the information of the plurality of antenna ports indicates whether the DMRS is mapped to a first type of DMRS ports or a second type of DMRS ports. The first type of DMRS ports (e.g., legacy DMRS ports) comprises ports corresponding to (1) resources to which frequency-domain Orthogonal Cover Coding (OCC) having a length of two is applicable, or (2) one or more consecutive symbols to which time-domain OCC having a length of two is applicable. The second type of DMRS ports (e.g., new DMRS ports) comprises ports corresponding to (1) resources to which frequency-domain OCC having a length greater than two is applicable, (2) resources in a Physical Resource Block associated with more than three CDM groups for type 2 DMRS, or (3) resources in a Physical Resource Block associated with more than two CDM groups for type 1 DMRS, or (4) one or more non-consecutive symbols to which time-domain OCC is applicable.

In some embodiments, the information of the plurality of antenna ports further indicates whether the first type of DMRS ports and the second type of DMRS ports are in a same CDM group or in different CDM groups. In some embodiments, the information of the plurality of antenna ports comprises a bitmap. Each bit of the bitmap is associated with a CDM group or a DMRS port configured or indicated for the second terminal device. In some embodiments, each bit indicates whether the DMRS port configured for the second terminal device or a DMRS port in the CDM group is the first type or the second type of DMRS ports.

In some embodiments, the first type of DMRS ports corresponds to a first index of a CDM group and the second type of antenna ports corresponds to a second index of a CDM group. A predefined rule specifies that the first index is smaller than the second index.

In some embodiments, the information of the plurality of antenna ports indicates a total number of DMRS ports configured for the second terminal device in each CDM group or for all scheduled CDM groups for the first terminal device and the second terminal device. In some embodiments, the information of the plurality of antenna ports further indicates a total number of DMRS ports in each CDM group or for all scheduled CDM groups for the first terminal device and the second terminal device.

In some embodiments, at least one of the plurality of antenna ports associated with the second transmission to the second terminal device is determined further based on at least one of: a TCI state index, one or more QCL parameters, or a spatial relation.

Some examples of the disclosed techniques are further described below.

Embodiment 1

The DMRS ports configured for co-scheduled UEs are also referred to as interference DMRS ports as they are used by the UE to perform interference estimation. When the interference DMRS ports include both the legacy DMRS ports (e.g., FD-OCC=2 and/or TD-OCC=2 for double symbol DMRS with consecutive DMRS symbol) and the new DMRS ports (e.g., FD-OCC>2 (4 or 6), more than 3 CDM groups in one PRB, or TD-OCC on non-consecutive OFDM symbols), additional information regarding whether an interference DMRS port is legacy or new DMRS port is indicated to the UE. In addition, information regarding whether legacy DMRS ports and/or new DMRS ports are configured in the same CDM group or different CDM groups can also be indicated.

Table 2 shows an example of an antenna ports field that indicates new DMRS ports in accordance with one or more embodiments of the present technology.

TABLE 2

| Value | Number of DMRS CDM group(s) without data | DMRS port(s) |
|---|---|---|
| 0 | 1 | 12, 13 |
| 1 | 2 | 12, 13 |
| 2 | 2 | 14, 15 |
| 3 | 3 | 12, 13 |
| 4 | 3 | 14, 15 |
| 5 | 3 | 16, 17 |
| 6 | 2 | 12, 14 |
| 7 | 4 | 12, 13 |
| 8 | 4 | 14, 15 |
| 9 | 4 | 16, 17 |
| 10 | 4 | 18, 19 |
| 11 | 5 | 12, 13 |
| 12 | 5 | 14, 15 |
| 13 | 5 | 16, 17 |
| 14 | 5 | 18, 19 |
| 15 | 5 | 20, 21 |
| 16 | 6 | 12, 13 |
| 17 | 6 | 14, 15 |
| 18 | 6 | 16, 17 |
| 19 | 6 | 18, 19 |
| 20 | 6 | 20, 21 |
| 21 | 6 | 22, 23 |
| 22-31 | Reserved | Reserved |

In some embodiments, Table 1 and Table 2 can be combined as one table, in which legacy DMRS ports and new DMRS ports can be distinguished by the value of the antenna port field. Table 3 shows an example of a combined table in accordance with one or more embodiments of the present technology. The same DMRS port index (e.g., 11) can be associated two values of this field: one value for the legacy DMRS ports (e.g., value 12 in Table 3) and one value for the new DMRS ports (e.g., value 19 in Table 3).

7

TABLE 3

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |
| 2 | 2 | 2, 3 | 1 |
| 3 | 3 | 0, 1 | 1 |
| 4 | 3 | 2, 3 | 1 |
| 5 | 3 | 4, 5 | 1 |
| 6 | 2 | 0, 2 | 1 |
| 7 | 3 | 0, 1 | 2 |
| 8 | 3 | 2, 3 | 2 |
| 9 | 3 | 4, 5 | 2 |
| 10 | 3 | 6, 7 | 2 |
| 11 | 3 | 8, 9 | 2 |
| 12 | 3 | 10, 11 | 2 |
| 13 | 1 | 0, 1 | 2 |
| 14 | 1 | 6, 7 | 2 |
| 15 | 2 | 0, 1 | 2 |
| 16 | 2 | 2, 3 | 2 |
| 17 | 2 | 6, 7 | 2 |
| 18 | 2 | 8, 9 | 2 |
| 19 | 1 | 11, 12 | 1 |
| 20 | 2 | 12, 13 | 1 |
| 21 | 2 | 14, 15 | 1 |
| 22 | 3 | 12, 13 | 1 |
| 23 | 3 | 14, 15 | 1 |
| 24 | 3 | 16, 17 | 1 |
| 25 | 2 | 12, 14 | 1 |
| 26 | 4 | 12, 13 | 2 |
| 27 | 4 | 14, 15 | 2 |
| 28 | 4 | 16, 17 | 2 |
| 29 | 4 | 18, 19 | 2 |
| 30 | 5 | 12, 13 | 2 |
| 31 | 5 | 14, 15 | 2 |
| 32 | 5 | 16, 17 | 2 |
| 33 | 5 | 18, 19 | 2 |
| 34 | 5 | 20, 21 | 2 |
| 35 | 6 | 12, 13 | 2 |
| 36 | 6 | 14, 15 | 2 |
| 37 | 6 | 16, 17 | 2 |
| 32-63 | Reserved | Reserved | Reserved |

In some embodiments, the last bit of the antenna port field can be used to indicate whether the DMRS ports of this CDM group and/or the co-scheduled DMRS ports are legacy DMRS ports or new DMRS ports. In some embodiments, the base station can indicate the DMRS port(s), the layer number(s), and/or the DMRS port(s) of the other CDM groups that are not used for the transmission. In some embodiments, the base station can indicate whether one or more CDM groups are legacy CDM groups (CDM groups that include legacy DMRS ports) or new CDM groups (CDM groups that include new DMRS ports).

In some embodiments, a predefined rule can specify that legacy DMRS ports and new DMRS ports are co-scheduled in different CDM groups. In some embodiments, the CDM group number without data is equal to 1 and DMRS port index indicates the use of new DMRS ports, the UE can derive that the DMRS ports for interference estimation are also new DMRS ports. In some embodiments, the CDM group number without data is greater than 1. If the DMRS port indices indicated for the target UE are new DMRS ports (e.g., value 24 in Table 1), the UE can derive that all the DMRS ports in the same CDM groups are new DMRS ports. In some embodiments, the CDM group number without data is greater than 1 but the DMRS port indices are not indicated for all CDM groups. The UE can derive that the DMRS ports in the same CDM group as indicated in the signaling message are new DMRS ports. The DMRS ports in the other CDM groups that are not indicated can be considered as either legacy or new DMRS ports. Additional information can be provided to indicate whether these DMRS ports are legacy or new DMRS ports.

In some embodiments, the indication of legacy or new DMRS ports can be performed based on one or more of the following options.

(1) In some embodiments, a predefined rule can specify that the legacy DMRS ports are mapped to CDM groups having lower indices. For example, the number of CDM groups without data is equal to 2, and the DMRS port index in the second CDM group (e.g., CDM group #1) has the value of 1, indicating that it is a legacy DMRS port. Such indication means that the DMRS port(s) in the first CDM group (e.g., CDM group #0) are also legacy DMRS ports. Alternatively, if the DMRS port index in the second CDM group (e.g., CDM group #1) has the value of 6, indicating that it is a new DMRS port, whether the DMRS port(s) in the first CDM group are legacy DMRS ports or new DMRS ports cannot be ascertained by this indication alone. Additional indication can be signaled to the UE to allow it to determine how to demodulate the signals.

As another example, the number of CDM groups without data is equal to 2, and the DMRS port index in the first CDM group (e.g., CDM group #0) has the value of 5, indicating that it is a new DMRS port. In such case, under the predefined rule, the UE can determine that the DMRS ports in the second CDM group (e.g., CDM group #1) are also new DMRS ports. Alternatively, if the DMRS port index in the first CDM group (e.g., CDM group #0) has the value of 0, indicating that it is a legacy DMRS port, whether the DMRS port(s) in the second CDM group are legacy DMRS ports or new DMRS ports cannot be ascertained by this indication alone. Additional indication can be signaled to the UE to allow it to determine how to demodulate the signals.

(2) In some embodiments, a different predefined rule can specify that there is no specific ordering of the legacy and new DMRS ports with respect to the CDM groups. Additional indication can be signaled regardless of legacy DMRS ports or new DMRS ports being used. For example, when the second CDM group is associated with legacy DMRS ports, the first CDM group can be a legacy DMRS CDM group or a new DMRS CDM group. If the UE is indicated with DMRS ports of the first CDM group, whether the first CDM group and the other CDM groups are legacy DMRS or new DMRS should be indicated to the UE.

(3) For Frequency Domain Multiplexing (FDM) based DMRS ports, more CDM groups can be supported in one PRB and fewer REs are needed in one CDM group. For example, for type2 DMRS, three CDM groups are supported for legacy DMRS and six CDM groups can be supported for new DMRS ports in one PRB. Two CDM groups of the new DMRS ports can be mapped onto the same number of REs, as compared to one legacy DMRS CDM group. If the legacy DMRS ports are co-scheduled with new DMRS ports that are in different CDM groups, the new DMRS ports are mapped on the different REs than the ones that the legacy DMRS ports are mapped to. Otherwise, the CDM group including the new DMRS ports should not be used for scheduling.

Figure 3:
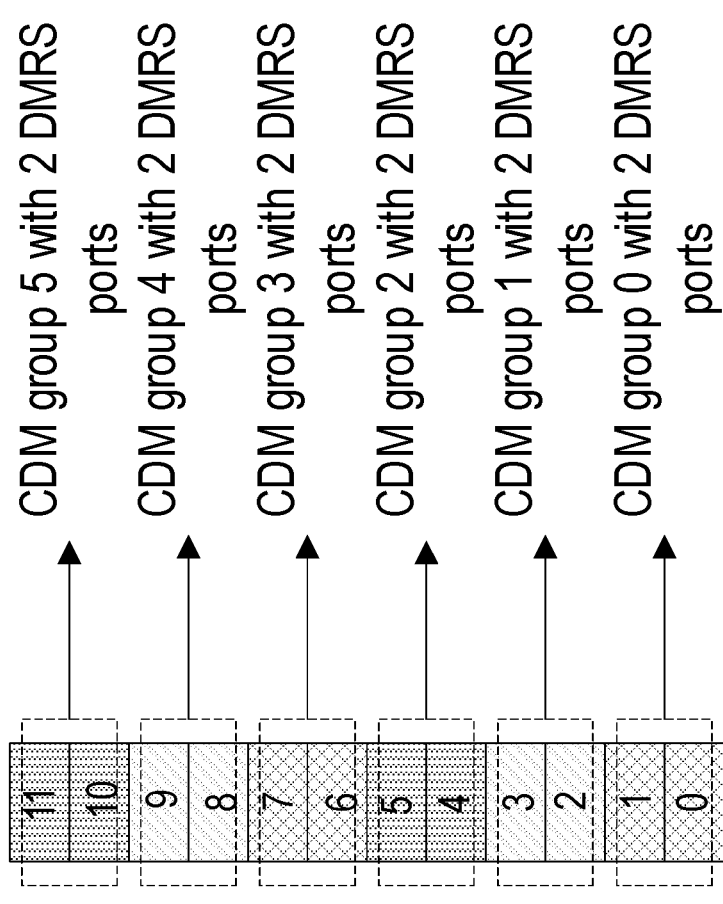
FIG. 3 illustrates an example DMRS port mapping of different Code Division Multiplexing (CDM) groups in accordance with one or more embodiments of the present technology.

FIG. 3 illustrates an example DMRS port mapping of different CDM groups in accordance with one or more embodiments of the present technology. FIG. 1B illustrates that REs 0, 1, 6, and 7 of CDM group #0 are mapped to legacy DMRS ports. The mapping to the four REs indicates that the legacy DMRS is also indicated for co-scheduled UE(s). In FIG. 3, new DMRS ports in CDM group 0 and CDM group 3 are mapped on the same REs of legacy CDM group #0 (the time-domain symbols are simplified in FIG. 3). However, if different CDM groups are used for legacy DMRS ports and new DMRS ports, the new DMRS ports should not be mapped on the same four REs. Here, CDM group 3 for new DMRS ports are different than the CDM group index (e.g., 0) from legacy DMRS ports, so new DMRS ports in CDM group 3 should not be used for scheduling. Alternatively, or in addition, the DMRS ports in CDM groups that are mapped to the same REs as the legacy DMRS ports should be indicated with lower priority to support more DMRS ports.

In some embodiments, the indication can be included using the reserved bit(s) in the DCI. For example, as shown in Table 1, the "Antenna Port" field includes reserved bits that can be used to indicate the additional information with respect to whether legacy or new DMRS ports are used, such as the rank, the layer number of the DMRS ports, the CDM size, or the length of FD-OCC in the other CDM groups. In some embodiments, a new field can be introduced in the DCI format(s) to indicate the additional information with respect to whether legacy or new DMRS ports are used.

Embodiment 2

With the addition of more DMRS ports in a CDM group, more complexity can be introduced. For example, for the DMRS port with FD-OCC having a length greater than 2 (e.g., 4 or 6), more DMRS ports can be included in one CDM group for interference detection and estimation. The base station can include additional indication to indicate the DMRS port(s) for interference detection.

In some embodiments, legacy DMRS ports are co-scheduled with new DMRS ports in the same CDM group. Whether the DMRS ports are legacy or new can be determined based on the number of DMRS ports in the CDM group. For example, as discussed in Embodiment 1, different indication values of the DMRS ports indication field can be used to distinguish whether the DMRS ports are legacy DMRS ports or new DMRS ports (e.g., the same DMRS port index being associated with two different values). The DMRS ports in the CDM group that are not configured for the transmission can be detected and used for interference estimation.

In some embodiments, a predefined rule can specify that, in one CDM group, the DMRS ports with lower indices are legacy DMRS ports. If the DMRS port indicated to UE is not lowest DMRS index value of this CDM group, it means the DMRS ports with lower indices are configured for other co-scheduled UEs. The current UE should detect these DMRS ports having lower indices as an interference DMRS ports.

For example, using the new/alternative mapping mechanism, up to four DMRS ports are supported in one CDM group when FD-OCC=4. The CDM group can include DMRS ports #0, 1, 6, and 7. If DMRS port #7 is indicated to the UE, the UE can assume that DMRS ports #0, 1, and 6 are configured for other co-scheduled UEs and should detect these ports for interference estimation.

If DMRS port #6 is indicated to the UE, the UE can assume that ports #0 and 1 are configured for other co-scheduled UEs and use these ports for interference estimation. Additional indication information can be signaled to the UE to indicate whether DMRS port #7 is configured for the UE's transmission or is configured for other co-scheduled UEs. Similarly, if DMRS port #0 is indicated to the UE, additional indication can be signaled to the UE to indicate whether all or part of DMRS ports #1, 6, and 7 are configured for the UE's transmission.

In some embodiments, the total number of DMRS ports for other co-scheduled UEs in the CDM group can be indicated to the UE. For example, if DMRS port #6 is indicated to the UE and the total number of DMRS ports configured for other UEs is equal to 3, then the UE can derive that DMRS port #7 is also configured for other UEs and should be detected for interference. If the total number of the DMRS ports configured for other UEs is equal to 2 instead, the DMRS port #7 is not detected. As another example, if DMRS port #0 is indicated to the UE and the total number of DMRS ports configured for other UEs is equal to 3, the UE can derive that all the other 3 DMRS ports should be detected as interference. If the total number of DMRS ports configured for other UEs is equal to 0, 1, or 2, the UE can apply a rule specifying that the DMRS ports configured for other UEs are ordered according to the port indices. For example, if the total number is equal to 2, the UE can determine that ports #1 and 6 are configured for co-scheduled UEs. If the total number is equal to 1, the UE can determine that port #1 is configured for co-scheduled UEs. If the total number is equal to 0, the UE can determine to not detect any of ports #1, 6, or 7.

In some embodiments, a one-bit indication can be signaled to the UE to indicate if the remaining DMRS ports in the CDM group should be detected for interference estimation. For example, if DMRS port #6 is indicated to the UE, the UE can derive that ports #0 and 1 are configured for co-scheduled UEs. With respect the port #7, if the one-bit indication is equal to 1, the UE can derive that port #7 should be detected as interference. On the other hand, if the one-bit indication is equal to 0, the UE can derive that port #7 is also configured for its transmission. In some embodiments, a multi-bit indication (e.g., a bitmap) can be used. For example, if DMRS port #1 is indicated to the UE, the UE can derive that port #0 is configured for co-scheduled UEs. With respect the ports #6 and 7, if the multi-bit indication is equal to "11", the UE can derive that both ports should be detected as interference. If the multi-bit indication is equal to "01", the UE can derive that port #7 is configured for its transmission. If the multi-bit indication is equal to "10", the UE can derive that port #6 is configured for its transmission. The multi-bit indicating being equal to "00" means that the UE does not need to detect ports #6 or 7.

Embodiment #3

In some embodiments, multiple UEs are scheduled by multiple Transmission and Reception Points (TRPs). Different Transmission Configuration Indicator (TCI) states can be configured for different TRPs. The co-scheduled DMRS ports can be indicated with a corresponding TCI state for the UE to determine the Quasi-Co-Location (QCL) parameters or spatial relation of the related co-scheduled DMRS ports. For example, two TPRs perform a PDSCH transmission to the UE and two DMRS ports are indicated to the UE (e.g., DMRS ports #0 and #2). Two TCI states are indicated to the UE in the DCI, with each TCI state associated with one PDSCH from one TRP. DMRS port #0 and DMRS port #1 are in the same CDM group. Considering that the same TCI state is supported for a CDM group, the TCI state of the co-scheduled DMRS port #1 is the same with the indicated DMRS port #0 for the UE. Similarly, the TCI state of DMRS port #3 is the same with DMRS port #2.

In some embodiments, multiple UEs are co-scheduled by multiple TRPs and the indicated DMRS ports are in one CDM group for the UE. In some embodiments, the co-scheduled DMRS ports are from other CDM groups and the TCI states of the co-scheduled DMRS ports are also be indicated to the UE. For example, DMRS ports #0 and 1 are indicated to UE, and the co-scheduled DMRS ports can be from other CDM groups and/or other TRPs. The TCI states corresponding to the co-scheduled DMRS ports are indicated to UE for the interference detection and estimation. Similar to TCI states, the QCL parameters or the spatial relation can also be indicated as the information of co-scheduled DMRS. In such case, only one TCI states is indicated to the PDSCH transmission, and if other DMRS ports are indicated as co-scheduled DMRS ports. Furthermore, the TCI states from different TRPs can be configured with different indexes. When the TCI states of the co-scheduled DMRS ports is indicated to UE, UE can derive whether the TCI state of the co-scheduled DMRS is from the TRP associated with PDSCH or the other TRPs.

Figure 4:
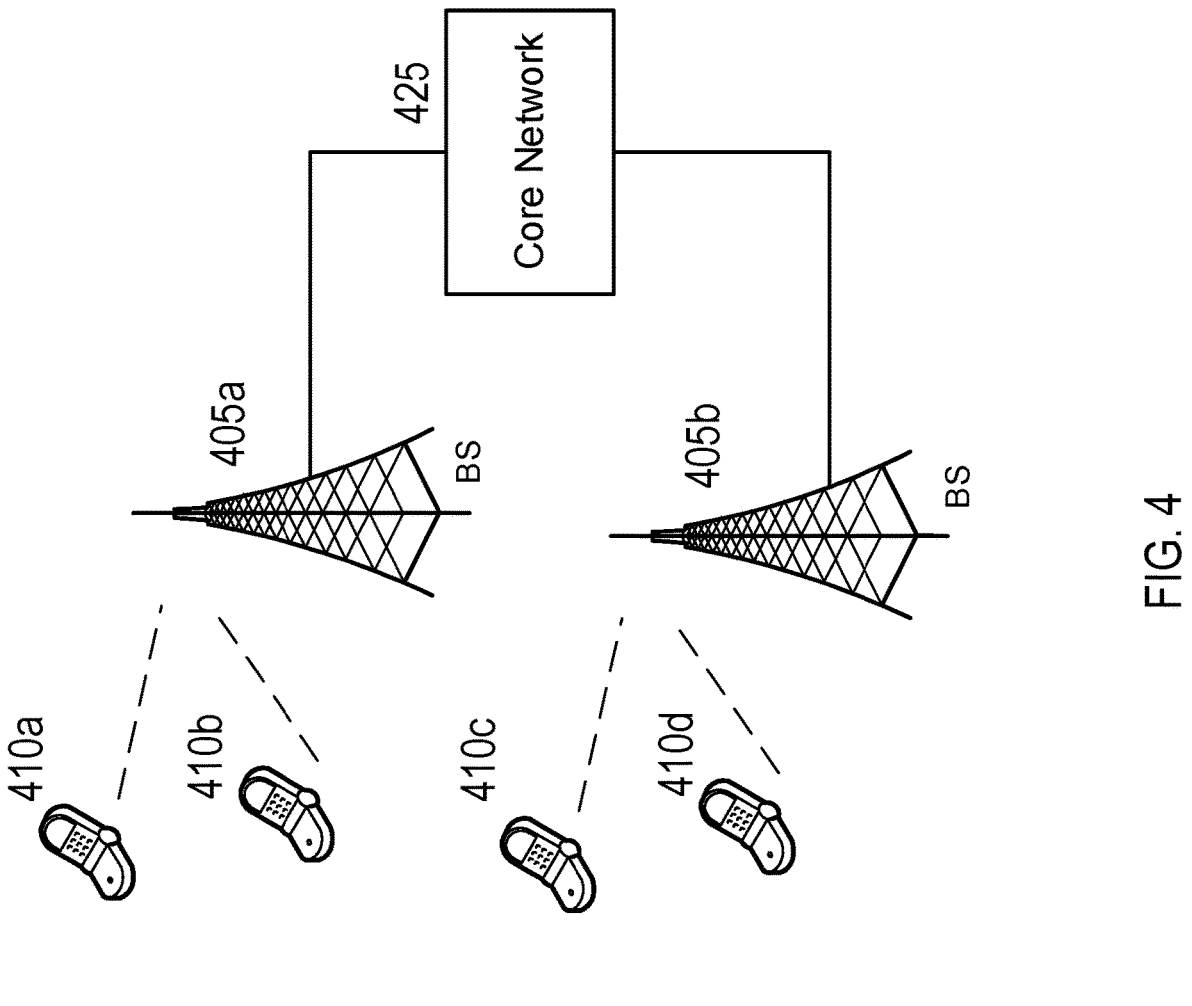
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BS s) 405a, 405b, one or more wireless devices (or UEs) 410a, 410b, 410c, 410d, and a core network 425. A base station 405a, 405b can provide wireless service to user devices 410a, 410b, 410c and 410d in one or more wireless sectors. In some implementations, a base station 405a, 405b includes directional antennas to produce two or more directional beams to provide wireless coverage in different sectors. The core network 425 can communicate with one or more base stations 405a, 405b. The core network 425 provides connectivity with other wireless communication systems and wired communication systems. The core network may include one or more service subscription databases to store information related to the subscribed user devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The user devices 410a, 410b, 410c, and 410d can support multiple different radio access technologies. The techniques and embodiments described in the present document may be implemented by the base stations of wireless devices described in the present document.

Figure 5:
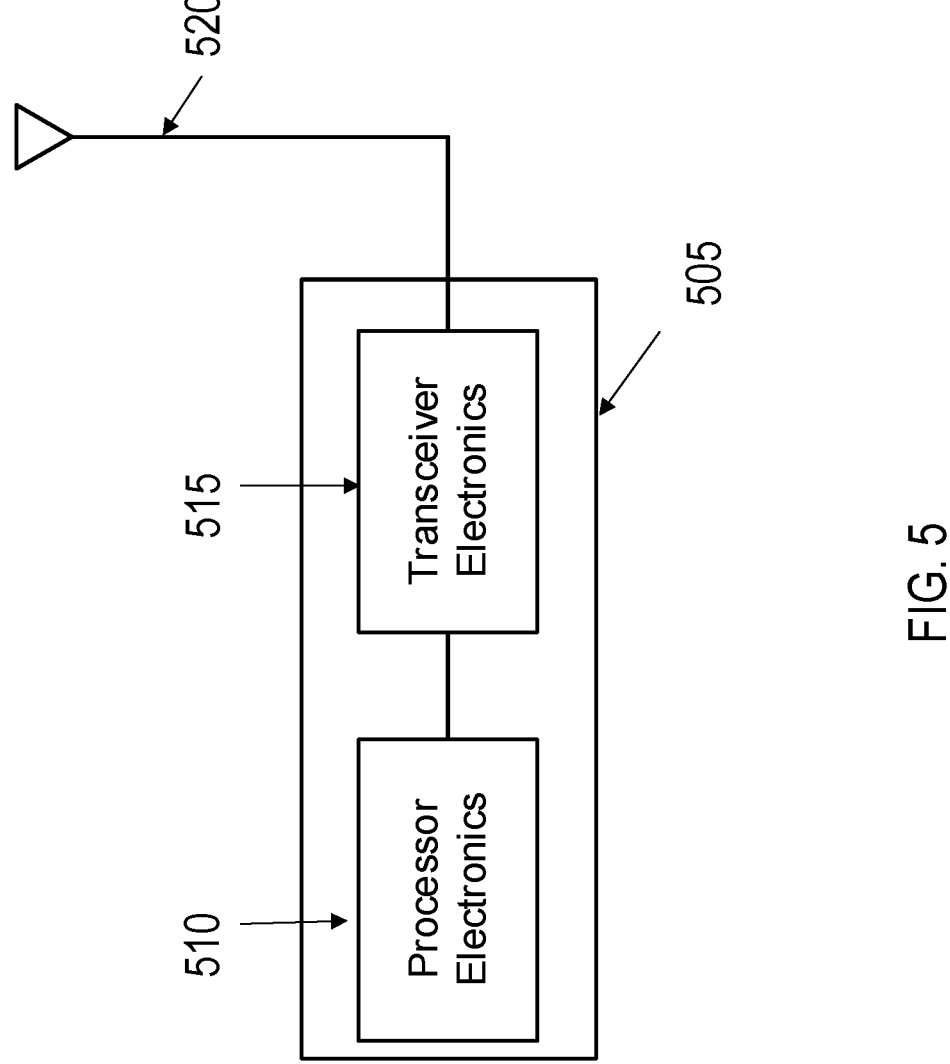
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a network node, a base station, or a wireless device (or a user device, UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505. In some embodiments, the radio station 505 may be configured to perform the methods described herein.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:

receiving, by a first terminal device, a Downlink Control Information (DCI) signaling message from a base station scheduling a first transmission from the base station to the first terminal device, wherein the DCI signaling message indicates information of a plurality of antenna ports associated with a Demodulation Reference Signal (DMRS) and a number of Code Division Multiplexing (CDM) groups without data indicated for the first transmission;

determining, by the first terminal device based on the DCI signaling message, that at least one of the plurality of antenna ports is associated with a second transmission to at least a second terminal device co-scheduled by the base station, wherein the DCI signaling message indicates whether the second terminal device co-scheduled by the base station is associated with a first type of DMRS ports or a second type of DMRS ports, wherein the information of the plurality of antenna ports comprises a bitmap, wherein each bit of the bitmap is associated with a CDM group or a DMRS port configured or indicated for the second terminal device, and wherein the each bit indicates whether the corresponding DMRS port configured for the second terminal device or a DMRS port in the corresponding CDM group is the first type of DMRS ports or the second type of DMRS ports; and demodulating, by the first terminal device, the DMRS based on the DCI signaling message and the determining.

2. The method of claim 1, wherein the information of the plurality of antenna ports indicates whether the DMRS is mapped to the first type of DMRS ports or the second type of DMRS ports, wherein the first type of DMRS ports comprises ports corresponding to (1) resources to which frequency-domain Orthogonal Cover Coding (OCC) having a length of two is applicable, or (2) one or more consecutive symbols to which time-domain OCC having a length of two is applicable, and wherein the second type of DMRS ports comprises ports corresponding to (1) resources to which frequency-domain OCC having a length greater than two is applicable, (2) resources in a Physical Resource Block associated with more than three CDM groups for type 2 DMRS, or (3) resources in a Physical Resource Block associated with more than two CDM groups for the first type of DMRS ports, or (4) one or more non-consecutive symbols to which time-domain OCC is applicable.

3. The method of claim 1, wherein the information of the plurality of antenna ports indicates a total number of DMRS ports configured for the second terminal device in each CDM group or for all scheduled CDM groups for the first terminal device and the second terminal device, or, wherein the information of the plurality of antenna ports indicates a total number of DMRS ports in each CDM group or for all scheduled CDM groups for the first terminal device and the second terminal device.

4. The method of claim 1, wherein a field in the DCI signaling that is different from an antenna port field indicates whether the second terminal device is associated with the first type of DMRS ports or the second type of DMRS ports.

5. The method of claim 1, wherein at least one of the plurality of antenna ports associated with the second transmission to the second terminal device is associated with a CDM group indicated by the number of CDM groups without data.

6. The method of claim 5, wherein the information of the plurality of antenna ports indicates a total number of DMRS ports configured for the second terminal device in each CDM group or for all scheduled CDM groups for the first terminal device and the second terminal device, or, wherein the information of the plurality of antenna ports indicates a total number of DMRS ports in each CDM group or for all scheduled CDM groups for the first terminal device and the second terminal device.

7. A method for wireless communication, comprising:

transmitting, by a base station, a Downlink Control Information (DCI) signaling message to a first terminal device scheduling a first transmission from the base station to the first terminal device and a second terminal device scheduling a second transmission from the base station to the second terminal device co-scheduled by the base station, wherein the DCI signaling message indicates information of a plurality of antenna ports associated with a Demodulation Reference Signal (DMRS) and a number of Code Division Multiplexing (CDM) groups without data to enable the first terminal device to demodulate, based on the DCI signaling message and a determination of whether at least one of the plurality of antenna ports is associated with the second transmission to the second terminal device co-scheduled by the base station, wherein the DCI signaling message indicates whether the second terminal device co-scheduled by the base station is associated with a first type of DMRS ports or a second type of DMRS ports, wherein the information of the plurality of antenna ports comprises a bitmap, wherein each bit of the bitmap is associated with a CDM group or a DMRS port configured or indicated for the second terminal device, and wherein the each bit indicates whether the corresponding DMRS port configured for the second terminal device or a DMRS port in the corresponding CDM group is the first type of DMRS ports or the second type of DMRS ports.

8. The method of claim 7, wherein the information of the plurality of antenna ports indicates whether the DMRS is mapped to the first type of DMRS ports or the second type of DMRS ports, wherein the first type of DMRS ports comprises ports corresponding to (1) resources to which frequency-domain Orthogonal Cover Coding (OCC) having a length of two is applicable, or (2) one or more consecutive symbols to which time-domain OCC having a length of two is applicable, and wherein the second type of DMRS ports comprises ports corresponding to (1) resources to which frequency-domain OCC having a length greater than two is applicable, (2) resources in a Physical Resource Block associated with more than three CDM groups for type 2 DMRS, or (3) resources in a Physical Resource Block associated with more than two CDM groups for type 1 DMRS, or (4) one or more non-consecutive symbols to which time-domain OCC is applicable.

9. The method of claim 7, wherein a field in the DCI signaling that is different from an antenna port field indicates whether the second terminal device is associated with the first type of DMRS ports or the second type of DMRS ports.

10. The method of claim 7, wherein at least one of the plurality of antenna ports associated with the second transmission to the second terminal device is associated with a CDM group indicated by a number of CDM groups without data.

11. A communication apparatus implemented as a first terminal device, comprising at least one processor configured to:
    receive a Downlink Control Information (DCI) signaling message from a base station scheduling a first transmission from the base station to the first terminal device, wherein the DCI signaling message indicates information of a plurality of antenna ports associated with Demodulation Reference Signal (DMRS) and a number of Code Division Multiplexing (CDM) groups without data indicated for the first transmission;
    determine, based on the DCI signaling message, that at least one of the plurality of antenna ports is associated with a second transmission to at least a second terminal device co-scheduled by the base station, wherein the DCI signaling message indicates whether the second terminal device co-scheduled by the base station is associated with a first type of DMRS ports or a second type of DMRS ports, wherein the information of the plurality of antenna ports comprises a bitmap, wherein each bit of the bitmap is associated with a CDM group or a DMRS port configured or indicated for the second terminal device, and wherein the each bit indicates whether the corresponding DMRS port configured for the second terminal device or a DMRS port in the corresponding CDM group is the first type of DMRS ports or the second type of DMRS ports; and
    demodulate, by the first terminal device, the DMRS based on the DCI signaling message and the determining.

12. The communication apparatus of claim 11, wherein the information of the plurality of antenna ports indicates whether the DMRS is mapped to the first type of DMRS ports or the second type of DMRS ports, wherein the first type of DMRS ports comprises ports corresponding to (1) resources to which frequency-domain Orthogonal Cover Coding (OCC) having a length of two is applicable, or (2) one or more consecutive symbols to which time-domain OCC having a length of two is applicable, and wherein the second type of DMRS ports comprises ports corresponding to (1) resources to which frequency-domain OCC having a length greater than two is applicable, (2) resources in a Physical Resource Block associated with more than three CDM groups for type 2 DMRS, or (3) resources in a Physical Resource Block associated with more than two CDM groups for type 1 DMRS, or (4) one or more non-consecutive symbols to which time-domain OCC is applicable.

13. The communication apparatus of claim 11, wherein the information of the plurality of antenna ports indicates a total number of DMRS ports configured for the second terminal device in each CDM group or for all scheduled CDM groups for the first terminal device and the second terminal device, or wherein the information of the plurality of antenna ports further indicates a total number of DMRS ports in each CDM group or for all scheduled CDM groups for the first terminal device and the second terminal device.

14. The communication apparatus of claim 11, wherein a field in the DCI signaling that is different from an antenna port field indicates whether the second terminal device is associated with the first type of DMRS ports or the second type of DMRS ports.

15. The communication apparatus of claim 11, wherein at least one of the plurality of antenna ports associated with the second transmission to the second terminal device is associated with a CDM group indicated by a number of CDM groups without data.

16. A communication apparatus implemented as a base station, comprising at least one processor configured to:
    transmit a Downlink Control Information (DCI) signaling message to a first terminal device scheduling a first transmission from the base station to the first terminal device and a second terminal device scheduling a second transmission from the base station to the second terminal device co-scheduled by the base station,
    wherein the DCI signaling message indicates information of a plurality of antenna ports associated with a Demodulation Reference Signal (DMRS) and a number of Code Division Multiplexing (CDM) groups without data to enable the first terminal device to demodulate, based on the DCI signaling message and a determination of whether at least one of the plurality of antenna ports is associated with the second transmission to the second terminal device co-scheduled by the base station,
    wherein the DCI signaling message indicates whether the second terminal device co-scheduled by the base station is associated with a first type of DMRS ports or a second type of DMRS ports,
    wherein the information of the plurality of antenna ports comprises a bitmap, wherein each bit of the bitmap is associated with a CDM group or a DMRS port configured or indicated for the second terminal device, and wherein the each bit indicates whether the corresponding DMRS port configured for the second terminal device or a DMRS port in the corresponding CDM group is the first type of DMRS ports or the second type of DMRS ports.

17. The communication apparatus of claim 16, wherein the information of the plurality of antenna ports indicates whether the DMRS is mapped to the first type of DMRS ports or the second type of DMRS ports, wherein the first type of DMRS ports comprises ports corresponding to (1) resources to which frequency-domain Orthogonal Cover Coding (OCC) having a length of two is applicable, or (2) one or more consecutive symbols to which time-domain OCC having a length of two is applicable, and wherein the second type of DMRS ports comprises ports corresponding to (1) resources to which frequency-domain OCC having a length greater than two is applicable, (2) resources in a Physical Resource Block associated with more than three CDM groups for type 2 DMRS, or (3) resources in a Physical Resource Block associated with more than two CDM groups for type 1 DMRS, or (4) one or more non-consecutive symbols to which time-domain OCC is applicable.

18. The communication apparatus of claim 16, wherein the information of the plurality of antenna ports indicates a total number of DMRS ports configured for the second terminal device in each CDM group or for all scheduled CDM groups for the first terminal device and the second terminal device, or the information of the plurality of antenna ports further indicates a total number of DMRS ports in each CDM group or for all scheduled CDM groups for the first terminal device and the second terminal device.

19. The communication apparatus of claim 16, wherein a field in the DCI signaling that is different from an antenna port field indicates whether the second terminal device is associated with the first type of DMRS ports or the second type of DMRS ports.

20. The communication apparatus of claim 16, wherein at least one of the plurality of antenna ports associated with the second transmission to the second terminal device is associated with a CDM group indicated by a number of CDM groups without data.

\* \* \* \* \*